(12) United States Patent
Lionetti et al.

(10) Patent No.: US 12,741,487 B2
(45) Date of Patent: Sep. 22, 2026

(54) TIRE REINFORCED BY METAL CORDS

(71) Applicant: The Goodyear Tire & Rubber Company, Akron, OH (US)

(72) Inventors: Robert Edward Lionetti, Colmar-Berg (LU); Arun Prasath Manogaran, Colmar-Berg (LU); Matthew Hecht, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 9 days.

(21) Appl. No.: 18/588,752

(22) Filed: Feb. 27, 2024

(65) Prior Publication Data

US 2025/0269689 A1 Aug. 28, 2025

(51) Int. Cl.
*B60C 9/00* (2006.01)
*B60C 9/04* (2006.01)
*B60C 9/20* (2006.01)

(52) U.S. Cl.
CPC .............. *B60C 9/0007* (2013.01); *B60C 9/04* (2013.01); *B60C 9/20* (2013.01);
(Continued)

(58) Field of Classification Search
CPC .... B60C 2009/0416; B60C 2009/2016; B60C 2009/0458; B60C 2009/0014;
(Continued)

(56) References Cited

U.S. PATENT DOCUMENTS 5,437,748 A * 8/1995 Bhagwat ............... B60C 9/0007 148/558
7,775,247 B2 8/2010 Sinopoli et al.
(Continued)

FOREIGN PATENT DOCUMENTS

EP 0834613 A1 4/1998
EP 0960749 A2 12/1999
(Continued)

OTHER PUBLICATIONS

Piet Watte, Strain aging in heavily drawn eutectoid steel wires, Scripta Materialia, vol. 34, No. 1, pp. 89-95, Jan. 1996, 7 pages.
(Continued)

*Primary Examiner* — Cedrick S Williams
(74) *Attorney, Agent, or Firm* — Eryn Fuhrer; June E. Rickey

(57) ABSTRACT

In a first aspect, the present invention is directed to a tire comprising a rubber component reinforced by one or more metal cords, wherein at least one metal cord of the one or more metal cords comprises mega tensile metal filaments including N essentially parallel core filaments, and M sheath filaments wound around the core filaments, with N being an integer from 2 to 5 and M being N−1. The mega tensile metal filaments have a diameter D within a range of 0.25 mm to 0.5 mm, and the sheath filaments have a lay length within a range of 50 multiplied by D to 70 multiplied by D. In another aspect, a cord reinforcement comprises at least one metal cord, which comprises mega tensile metal filaments, including N=3 core filaments and M=2 sheath filaments, wherein D is within a range of 0.1 mm to 0.5 mm.

4 Claims, 2 Drawing Sheets

(52) U.S. Cl.

CPC ................. *B60C 2009/0014* (2013.01); *B60C 2009/0425* (2013.01); *B60C 2009/0458* (2013.01); *B60C 2009/2016* (2013.01)

(58) Field of Classification Search

CPC .... B60C 2009/0425; B60C 2009/0071; B60C 2009/0007; B60C 9/20; B60C 9/18

See application file for complete search history.

(56) References Cited

U.S. PATENT DOCUMENTS

| | | | | |
|---|---|---|---|---|
| 2005/0051251 | A1 * | 3/2005 | Sinopoli | B60C 9/0007 57/902 |
| 2012/0067491 | A1 * | 3/2012 | Assaad | B60C 9/2006 152/527 |
| 2019/0071820 | A1 * | 3/2019 | Wang | D07B 1/062 |
| 2022/0048328 | A1 | 2/2022 | Suzuki et al. | |

FOREIGN PATENT DOCUMENTS

| | | | | | |
|---|---|---|---|---|---|
| EP | 2433814 | B1 | | 5/2014 | |
| JP | H0672373 | B2 | | 9/1994 | |
| JP | 2019119320 | A | * | 7/2019 | D07B 1/062 |
| RU | 2495761 | C1 | * | 10/2013 | |
| WO | 2013098738 | A1 | | 7/2013 | |

OTHER PUBLICATIONS

Gent et al., “The Pneumatic Tire,” Chapter 3, Published by the National Highway Traffic Safety Administration, pp. 79-103, 2005.

Nokian Tyres PLC, “Reinforcing Materials in Rubber Products,” Retrieved from the Internet: https://laroverket.com/wp-content/uploads/2015/03/reinforcing_materials.pdf, pp. 1-114, 2015.

European Search Report for Application No. EP25159298.6 mailed Jul. 3, 2025.

* cited by examiner 1
3
9
15
14
13
16
8
EP
7
6
5
4
10
r
c
a

TIRE REINFORCED BY METAL CORDS

FIELD OF THE INVENTION

The present invention is directed to a tire comprising metal cords, particularly comprising a rubber component reinforced by metal cords. Furthermore, the invention is directed to a cord reinforcement for a tire comprising one or more metal cords.

BACKGROUND OF THE INVENTION

Multiple rubber components of tires are typically reinforced by cords, such as textile cords or metal cords, to improve tensile properties and robustness of such rubber components. While many advanced types of cord and/or fabric reinforcements have been developed for tires over the past decades, significant room for improvement remains.

SUMMARY OF THE INVENTION

In a first aspect, the present invention is directed to a tire comprising a rubber component reinforced by one or more metal cords. At least one metal cord of the one or more metal cords comprises mega tensile metal filaments including N core filaments arranged essentially in parallel to one another in the cord, and M sheath filaments wound around the core filaments, wherein N is an integer from 2 to 5 and M is N−1. Furthermore, the mega tensile metal filaments have a diameter D within a range of 0.25 mm to 0.5 mm, and the sheath filaments have a lay length within a range of 50 multiplied by D to 70 multiplied by D.

In a second aspect, the present invention is directed to a tire comprising a rubber component reinforced by one or more metal cords, wherein at least one metal cord of the one or more metal cords comprises mega tensile metal filaments including three core filaments arranged essentially in parallel to one another in the cord and two sheath filaments wound around the core filaments, and wherein the mega tensile metal filaments have a diameter D within a range of 0.1 mm to 0.5 mm, and the sheath filaments have a lay length within a range of 50 multiplied by D to 70 multiplied by D.

In a third aspect, the present invention is directed to a cord reinforcement for a tire comprising one or more metal cords, wherein at least one metal cord of the one or more metal cords comprises mega tensile metal filaments including three core filaments arranged essentially in parallel to one another in the cord and two sheath filaments wound around the core filaments. The mega tensile metal filaments have a diameter D within a range of 0.1 mm to 0.5 mm, and the sheath filaments have a lay length within a range of 50 multiplied by D to 70 multiplied by D.

BRIEF DESCRIPTION OF THE DRAWINGS

The invention will be described by way of example and with reference to the accompanying drawings in which.

DETAILED DESCRIPTION OF THE INVENTION

Figure 1:
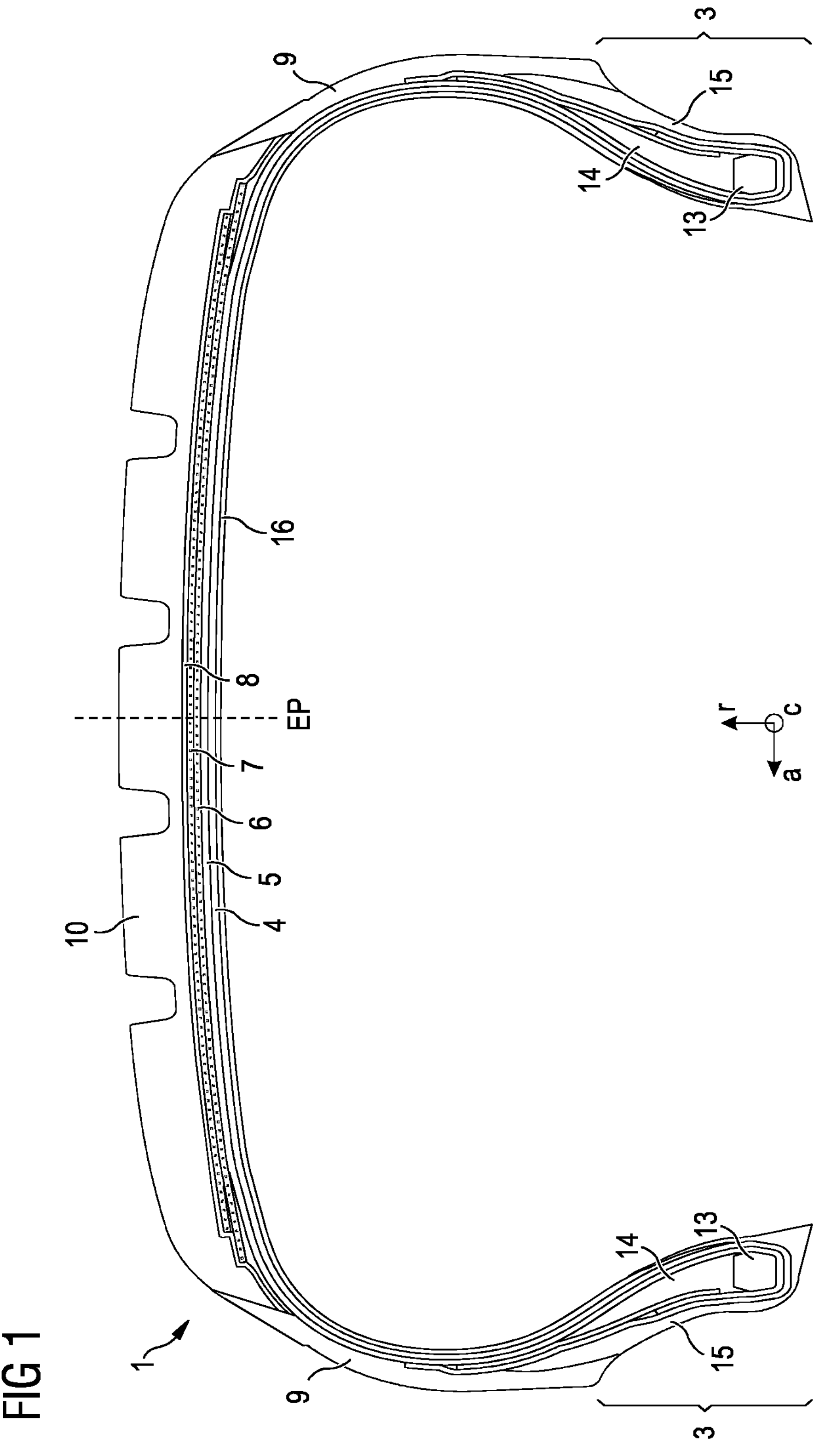
FIG. 1 is a schematic cross section of a tire having two metal cord reinforced belts in accordance with an embodiment of the present invention.

According to the first aspect, the present invention is directed to a tire comprising a rubber component reinforced by one or more metal cords. At least one metal cord of the one or more metal cords (such as each cord of the rubber component) comprises (or is formed by) mega tensile metal filaments including (or consisting of) N core filaments arranged essentially in parallel to one another in the cord, and M sheath filaments wound around the core filaments, wherein N is an integer from 2 to 5 and M is N−1 (i.e., N minus 1). Furthermore, the mega tensile metal filaments have a diameter D within a range of 0.25 mm to 0.5 mm, and the sheath filaments optionally have a lay length within a range of 50 multiplied by D to 70 multiplied by D.

The construction of said at least one metal cord, which may also be described as having an N+M cord construction, together with the mega tensile property of its metal filaments, provides a strong and/or light weight cord. For instance, such cords allow increasing the strength of a cord reinforcement and thus the durability of the rubber component and/or reducing the weight of the cord reinforcement and/or the rubber component of the tire, thereby helping to reduce vehicle fuel/energy consumption.

Mega tensile means herein at least a tensile strength (TS, in MPa) defined by the equation TS=4400 MPa−(2000 MPa/mm)×D (where D is the filament diameter in mm and × means multiplied by), or equivalent. In other words, a metal filament, such as a steel filament, is mega tensile if its tensile strength is at least as high as calculated by the equation. Metals, such as steel, which are suitable to obtain such tensile strengths in a filament are available as such. Furthermore, lay length means herein a length, or in other words a distance, of one revolution of a sheath filament (wound around the core filaments) along one or more core filaments, or equivalent.

In one embodiment, the mega tensile metal filaments (or in other words, each of the mega tensile metal filaments) have a diameter which is within a range of 0.25 mm to 0.32 mm, preferably within a range of 0.25 mm to 0.3 mm, optionally, of less than 0.3 mm.

In another embodiment, the tire is a pneumatic tire and/or the rubber component is selected from one or more of a metal cord-reinforced belt, a metal cord-reinforced carcass ply, a metal cord-reinforced rubber ply, and a metal cord-reinforced rubber ply strip.

In still another embodiment, the tire is pneumatic and/or radial tire.

In still another embodiment, the tire is a pneumatic (and, optionally, radial) tire comprising a tread portion, two axially spaced-apart bead portions, at least one carcass ply connecting and/or folded around both bead portions, and one or more cord-reinforced belts arranged radially between the at least one carcass ply and the tread portion in a crown area of the tire. Preferably, at least one of the cord-reinforced belts is reinforced by the one or more metal cords. More preferably, at least two or exactly two of the belts are reinforced by the one or more metal cords. Even more preferably, most or all of the metal cords of one, two or more of the belts are metal cords comprising or formed by said mega tensile steel filaments.

Optionally, the tire has one or two carcass plies. Preferably, one or both of the carcass plies are reinforced by cords. Optionally, at least one of the carcass plies is textile cord reinforced, such as by polyester, e.g., PET, and/or polyamide, e.g., Nylon™. Optionally, at least one of the carcass plies is metal cord reinforced, such as steel cord reinforced, e.g., by the metal cords described herein.

In still another embodiment, the tire comprises two cord-reinforced belts, wherein a first belt of the two belts is reinforced by a first plurality of metal cords extending in parallel to one another, and a second belt of the two belts is reinforced by a second plurality of metal cords extending in parallel to one another, and wherein the metal cords of the first plurality of metal cords and metal cords of the second plurality of metal cords optionally have oppositely oriented angles with respect to an equatorial plane of the tire. Preferably, said angles have absolute values within a range of 15° to 30°. Thus, for instance, a first angle of cords in a first belt may be 25° (+/−2° or 1°) and a second, oppositely oriented angle of cords in a second belt may be −25° (+/−2° or 1°). Such angles may also have different absolute values but are preferably still oppositely oriented with respect to the equatorial plane of the tire.

In still another embodiment, the core filaments have a lay length larger than 500 mm, or preferably larger than 1000 mm. Optionally, the core filaments may also be described as having a lay length of infinity.

In still another embodiment, the sheath filaments have a lay length within a range of 13 mm to 20 mm, preferably of 14 mm to 17 mm, or even more preferably of 15.5 mm to 16.5 mm, or of about 16 mm.

In still another embodiment, the mega tensile filaments are one or more of monofilaments, and filaments having a circular cross-section perpendicular to the extension of a filament.

In still another embodiment, said at least one metal cord has one or more of:

i) an elongation at break of less than 2.5%, preferably of up to 2.3%, or within a range of 2.0% to 2.3%, as determined according to ASTM D2969, such as by using a 200 mm gauge length (the length of the cord between cord grips of the testing device) and an extensometer device, or equivalent;

ii) a maximum cord diameter, measured perpendicularly to the cord, of less than 1 mm, preferably of at least 0.5 mm, or within a range of 0.6 mm to 0.9 mm, or 0.7 mm to 0.9 mm; and iii) a breaking strength within a range of 1000 N to 1500 N, preferably of 1050 N to 1300 N, or even more preferably of 1100 N to 1300 N, again determined according to ASTM D2969, or equivalent.

In still another embodiment, the mega tensile metal filaments are mega tensile steel filaments. In other words, the cord can optionally be considered as a steel cord.

In still another embodiment, the steel has a carbon content from 0.8 weight percent to 1.2 weight percent. In particular, this is one embodiment of a suitable steel composition for a mega tensile filament.

In still another embodiment, the mega tensile steel filaments are coated with brass including one or more of: a range of 2.2 g of brass per kg of steel to 4.6 g of brass per kg of steel; and a copper content of the brass within a range of 61 weight percent to 66 weight percent. For instance, a respective half product can be brass coated before manufacturing the filament. Typical brass thicknesses on the filament are optionally within a range of 0.05 μm to 0.4 μm, preferably within a range of 0.1 μm to 0.4 μm. In particular, brass helps to significantly improve the adhesion to rubber in the rubber component. Preferably, the tire is a cured tire and/or the rubber component is a sulfur-cured rubber component.

In still another embodiment, the tire comprises a tread portion and two belts (or in other words two belt plies) arranged radially below/inward the tread portion, wherein each belt comprises a plurality of the metal cords arranged in parallel to one another, wherein the metal cords comprise said mega tensile metal filaments, and wherein the mega tensile metal filaments are preferably mega tensile steel filaments. Optionally, the belts may be described as comprising a rubber composition reinforced by the plurality of the metal cords. Rubber compositions for tires, particularly rubber compositions for belts and/or for other tire rubber components reinforced by metal cords are known to the person skilled in the art.

In still another embodiment, the belts are covered by a textile cord or fabric reinforced overlay (or in other words an overlay ply, or one or more overlay ply strips), radially between a radially outer belt of the two belts and the tread portion.

In still another embodiment, the at least one metal cord has an N+M construction. Preferably, most or all of the metal cords in the rubber component have such a construction.

In still another embodiment, the at least one metal cord has an N+M construction, with N=3 and M=2, and/or wherein the mega tensile metal filaments are mega tensile steel filaments.

In still another embodiment, the at least one metal cord has a 3+2×D construction, wherein D is preferably within a range of 0.25 mm to 0.30 mm, or within a range of 0.265 mm to 0.275 mm.

In still another embodiment, the rubber component is a metal cord reinforced belt which is reinforced by multiple parallel metal cords comprising the mega tensile metal filaments, wherein the parallel metal cords are preferably provided within a range of 13 ends per inch (EPI) to 20 ends per inch in the belt, and/or with a rivet within a range of 0.3 mm to 0.7 mm, preferably within a range of 0.35 mm to 0.6 mm, or of 0.4 mm to 0.6 mm or to 0.55 mm. As known in the art, a rivet of cords is determined perpendicularly to the parallel cords. In particular, the rivet can be determined on the basis of an EPI value of the cords and a maximum cord diameter, or equivalent.

As common in the tire art, ends per inch can also be understood as cords per inch, wherein a measurement is made perpendicularly to the extension of the cords.

In still another embodiment, the metal cord reinforced belt has a radial thickness (or, in other words, gauge), measured in the equatorial plane of the tire, within a range of 1.0 mm to 1.4 mm.

In still another embodiment, the metal cord reinforced belt comprises parallel metal cords, or in other words a metal cord reinforcement consisting of the parallel metal cords, wherein a strength to weight ratio of the reinforcement, or the parallel metal cords, is within a range of 10500 N/(kg/$m^2$) to 15000 N/(kg/$m^2$), preferably of 11000 N/(kg/$m^2$) to 15000 N/(kg/$m^2$), or of 11500 N/(kg/$m^2$) to 13000 N/(kg/$m^2$). In particular, a strength to weight ratio can be determined herein as the product of i) a metal cord breaking strength and an EPI value of the cords in the belt, divided by ii) the product of linear density of the cord, the EPI value, and the factor 1/25.4 mm (or the 1/inch). In a non-limiting example, such a calculation for a steel cord reinforcement of parallel steel cords having a construction of 3+2×0.270, with mega tensile steel filaments and a cord breaking strength of 1154 N, and 19.7 EPI provides (1154 N×19.7/25.4 mm)/(2.28 g/m×19.7/25.4 mm×1/25.4 mm)=(1154 N)/(2.28 kg/m×1/25.4 m)=12856 N/(kg/m$^2$).

In the second aspect, a tire comprises a rubber component reinforced by one or more metal cords, wherein at least one metal cord of the one or more metal cords comprises mega tensile metal filaments (or, in other words, is formed by these filaments) including three core filaments arranged essentially in parallel (or parallel) to one another in the cord and two sheath filaments wound around the core filaments. The mega tensile metal filaments have a diameter D within a range of 0.1 mm to 0.5 mm, and the sheath filaments optionally have a lay length within a range of 50 multiplied by D to 70 multiplied by D.

In one embodiment, the mega tensile metal filaments are mega tensile steel filaments, and/or the cord has a 3+2×D construction, with D being optionally within a range of 0.2 mm to 0.3 mm. Preferably, a lay length of the sheath filaments is within a range of 15 mm to 17 mm.

In another embodiment, D is within a range of 0.25 mm to 0.3 mm.

In still another embodiment, the tire is one of a truck tire, and a passenger car tire.

In still another embodiment, the tire has a load range from C to G, preferably from E to F, as provided in the 2023 Yearbook of The Tire and Rim Association, Inc. (TRA), or equivalent.

According to the third aspect, the present invention is directed to a cord reinforcement for a tire comprising one or more metal cords (preferably steel cords), wherein at least one metal cord of the one or more metal cords comprises mega tensile metal filaments (preferably, steel filaments) including three core filaments arranged essentially in parallel to one another in the cord and two sheath filaments (preferably, helically) wound around the core filaments. The mega tensile metal filaments have a diameter D within a range of 0.1 mm to 0.5 mm (preferably, 0.25 mm to 0.3 mm), and the sheath filaments have a lay length within a range of 50 multiplied by D to 70 multiplied by D.

The present invention allows reducing the weight and/or increasing the strength of a reinforcement of rubber components such as of metal cord reinforced belts. This helps to improve tire durability and/or reduce vehicle energy and/or fuel consumption by reducing rolling resistance. In particular, smaller diameter cords allow the reduction of the thickness of rubber components such as of a belt, thereby reducing weight and rolling resistance. Furthermore, this has a positive impact as less steel and less rubber material has to be produced which reduces energy consumption, $CO_2$ emissions, and requires less raw materials. These effects may apply throughout the supply and/or production chain of a tire. Moreover, said cord reinforcement helps to provide an advanced impact resistance. In particular, the described cord constructions allow an advanced rubber penetration which helps to reduce or avoid corrosion propagation if a penetration from the environment reaches the cord reinforcement. Furthermore, the suggested cord constructions may also provide high cord strength levels compared to cords which are twisted in single layer and which may require preforming filaments involving a reduction of filament strength. In contrast, high cord strengths help to carry higher loads.

FIG. 1 shows a schematic cross section of a tire 1, such as of a radial pneumatic light truck tire and/or passenger car tire. The depicted tire 1 comprises two axially spaced apart bead portions 3 which are connected by two carcass plies 4, 5 folded around beads 13 at the respective bead portions 3. Furthermore, the tire 1 comprises a tread portion 10, a pair of bead apexes 14, a pair of chafers 15, a pair of sidewalls 9, as well as an innerliner 16 at least partially enclosing a tire cavity.

In accordance with the present embodiment, the tire 1 further comprises two belts 6, 7, or in other words belt plies, which are reinforced by a plurality of steel cords. The radially outer belt 7 is further covered by a textile reinforced overlay 8. The belts 6, 7 and the overlay 8 are arranged radially between the carcass ply 5 and the tread portion 10, particularly in a crown portion/area, of the tire 1. Thus, the belts 6, 7 are arranged radially below the tread portion 10. The equatorial plane of the tire 1, indicated by reference sign EP, is perpendicular to the axial direction a of the tire 1.

In various passages, reference is made to the radial direction r and the axial direction a. The axial direction a is parallel to the axis of rotation of the tire 1. The radial direction r is perpendicular to the axial direction a. A circumferential direction c is also perpendicular to the axial direction a and the radial direction r. A reference to one of these directions is not necessarily limited to a specific orientation, unless noted otherwise herein.

Figure 2A:
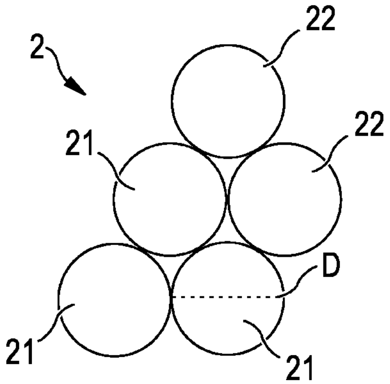
FIG. 2*a* is a schematic cross section of a steel cord having three parallel core filaments and two sheath filaments wound around the core filaments, in accordance with an embodiment of the present invention.
Figure 2B:
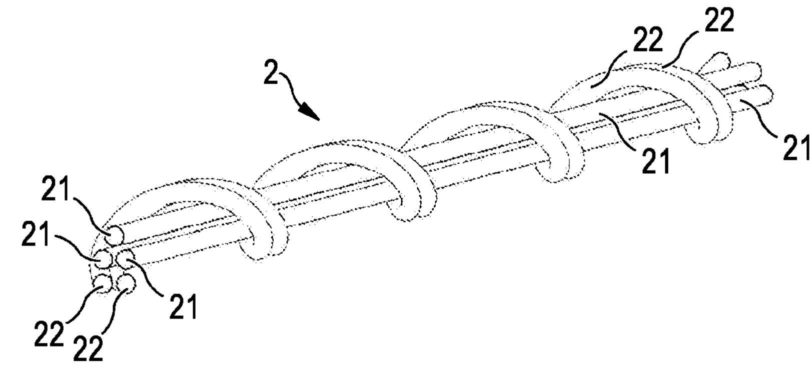
FIG. 2*b* is a schematic perspective view of the steel cord shown already in FIG. 2*a*.

FIG. 2*a* shows a schematic cross section of a preferred embodiment of a metal cord 2 which may be used in one or more of the belts 6, 7, preferably in both of them, as metal cord reinforcement. The schematically depicted cord 2 comprises five mega tensile steel filaments 21, 22, wherein three of the mega tensile steel filaments are parallel mega tensile core filaments 21 and two of the filaments are mega tensile sheath filaments 22, which are helically wound around the three core filaments 21, which is also indicated in FIG. 2*b*. In particular, the five filaments 21, 22 are not twisted together as in a 3×2 construction but have a 3+2 construction instead. Thus, in other words, both sheath filaments 22 are wound together around the three core filaments 21 with a lay length along the core filaments 21 (not explicitly shown in FIG. 2*a*). A lay length of the sheath filaments 22 is within a range of 14 mm to 18 mm, and particularly about 16 mm. Each filament has a filament diameter D, such as within a range of 0.25 mm to 0.3 mm, or particularly about 0.27 mm in the present non-limiting embodiment. A cord diameter can be measured as a maximum diameter of the cord, measured perpendicularly to the extension of the cord 2. In the present embodiment, the cord diameter is preferably within a range of 0.75 mm to 0.95 mm.

FIG. 2*b* shows a schematic partial perspective view of the cord 2, using the same reference signs as in FIG. 2*a*. As visible in FIG. 2*b*, the two sheath filaments 22 are helically wound together (or, in other words, adjacent each other) around the three core filaments 21. The five filaments 21, 22 form the cord 2.

Figure 3:
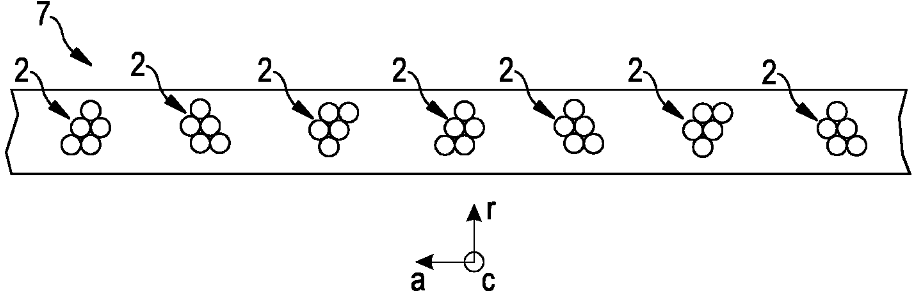
FIG. 3 is a partial schematic cross section of a belt comprising a plurality of parallel metal cords in accordance with an embodiment of the present invention.

FIG. 3 shows a schematic partial cross section in parallel to the radial and axial directions of the belt 7 of the tire according to FIG. 1, including a plurality of schematically indicated parallel cords 2. While such cords 2 may extend in parallel to the circumferential direction c, they preferably have an angle with the equatorial plane of the tire, such as already mentioned herein above.

Below Table 1 lists Comparative Examples 1 to 5 of steel cord reinforced belts and an Inventive Example of a steel cord reinforced belt. For each of the Examples of Table 1, the respective number of filaments, filaments' diameter D, cord construction, cord breaking strength, cord diameter, EPI in the belt, belt gauge (or in other words radial thickness of the belt), belt gauge reduction over the belt gauge of Comparative Example 1, rivet, breaking strength per inch (corresponding to the cord breaking strength multiplied by EPI), and cord weight/cords' linear density is provided.

Comparative Example 1 has a belt gauge of 1.52 mm. Apart from Comparative Example 5, all other Examples of Table 1 have smaller belt gauges which may be desirable, e.g., to save rubber material and provide more tire design space. However, for the other Comparative Examples 2, 3, and 4 there are other potential drawbacks. Comparative Example 2 is, e.g., difficult to manufacture with respect to its relatively large monofilament diameter, and/or has the disadvantage of providing no open shape for rubber penetration allowing mechanical interlocking in the rubber composition of the belt. Comparative Example 3, e.g., has a very small rivet, which may increase the potential for cracks between the cords in the belt. Also, its individual cord strength is relatively low. Comparative Example 4 is worst in terms of individual cord breaking strength, despite the use of mega tensile filaments, and even more comprises a zero rivet. This may result in an increased probability of cracks initiated between neighboring cords. Mega tensile (MT) filaments are used in all of the Comparative Examples 2 to 5. Comparative Example 1 is formed by super tensile (ST) steel filaments instead. While the cord breaking strength of Comparative Example 5 is relatively good, the gauge of its belt is even 9% higher than the respective gauge of Comparative Example 1, making Comparative Example 5 a less interesting example. The Inventive Example provides an advanced combination of relatively high cord breaking strength, limited cord weight, and cord diameter, which allows for instance to reduce the belt gauge, including a reduction of cord reinforcement weight and/or rubber weight in the belt.

TABLE 1

| Material/Property | Comp. Ex. 1 | Comp. Ex. 2 | Comp. Ex. 3 | Comp. Ex. 4 | Comp. Ex. 5 | Inventive Example |
|---|---|---|---|---|---|---|
| No. of filaments | 5 | 1 | 2 | 3 | 3 | 5 |
| Filament D (mm) | 0.35 | 0.575 | 0.397 | 0.3 | 0.395 | 0.27 |
| Cord construction | 2 + 2x.35 ST | 1x.575 MT | 2x.397 MT | 3x.30 MT | 3x.395 MT | 3 + 2x.27 MT |
| Cord breaking strength (N) | 1236 | 947 | 941 | 767 | 1544 | 1154 |
| Cord diameter (mm) | 0.99 | 0.58 | 0.79 | 0.86 | 1.13 | 0.83 |
| EPI | 17.5 | 24.0 | 24.1 | 29.6 | 14.7 | 19.7 |
| Belt gauge (mm) | 1.52 | 1.11 | 1.32 | 1.39 | 1.66 | 1.36 |
| Belt gauge reduction over Comp. Ex. 1 (%) | 0 | 27 | 13 | 9 | −9 | 11 |
| Rivet (mm) | 0.46 | 0.48 | 0.26 | 0 | 0.59 | 0.47 |
| Breaking strength per inch (N/inch) | 21.6k | 22.7k | 22.7k | 22.7k | 22.7k | 22.7k |
| Cord weight g/m | 3.06 | 2.04 | 1.97 | 1.69 | 2.93 | 2.28 |

All aspects, their embodiments and features as disclosed herein may be combined with one another.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire comprising a rubber component reinforced by one or more metal cords, wherein the metal cords comprises mega tensile metal filaments including N core filaments arranged essentially in parallel to one another in the cord, and M sheath filaments wound around the core filaments, wherein the metal cords have an M+N construction, with N being 3 and M being 2 and a cord diameter of 0.75 mm to 0.95 mm, and wherein the mega tensile metal filaments are mega tensile steel monofilaments having a diameter D of 0.27 mm, a carbon content of 0.8 wt % to 1.2 wt %, and wherein the mega tensile steel filaments are coated with brass having a range of 2.2 g of brass per kg or steel to 4.6 g of brass per kg of steel, and wherein the core filaments have a lay length larger than 1000 mm and wherein the sheath filaments have a lay length within a range of 14 mm to 17 mm;

wherein the at least one metal cord has an elongation at break of less than 2.5% and a breaking strength of 1100N to 1300N determined according to ASTM D2969;

wherein the rubber component is a belt reinforced by multiple parallel metal cords comprising the mega tensile metal filaments, wherein the parallel metal cords are provided with i) a range of 13 EPI to 20 EPI in the belt, and ii) a rivet within a range of 0.3 mm to 0.7 mm, wherein the belt has a radial thickness, measured in the equatorial plane of the tire, within a range of 1.0 mm to 1.4 mm and wherein a strength to weight ratio of the multiple parallel metal cords comprising the mega tensile metal filaments is within a range of 11500 N/(kg/m$^2$) to 15000 N/(kg/m$^2$), wherein the tire has a load range from C to G measured as provided in the 2023 Yearbook of the Tire and Rim Association, Inc.

2. The tire according to claim 1, comprising a tread portion and two belts arranged radially below the tread portion, wherein each belt comprises a plurality of the metal cords arranged in parallel to one another.

3. The tire according to claim 1, wherein the tire is a pneumatic tire comprising a tread portion, two axially spaced-apart bead portions, at least one carcass ply connecting both bead portions, and one or more cord-reinforced belts arranged radially between the at least one carcass ply and the tread portion in a crown area of the tire, wherein at least one of the cord-reinforced belts is reinforced by the one or more metal cords.

4. The tire according to claim 3, wherein the tire comprises two cord-reinforced belts, and wherein a first belt of the two cord-reinforced belts is reinforced by a first plurality of metal cords extending in parallel to one another, and a second belt of the two cord-reinforced belts is reinforced by a second plurality of metal cords extending in parallel to one another, and wherein the metal cords of the first plurality of metal cords and the metal cords of the second plurality of metal cords have oppositely oriented angles with respect to an equatorial plane of the tire within a range of 15° to 30°.

* * * * *